US00RE36429E

United States Patent [19]

Yamaguchi

[11] E Patent Number: Re. 36,429

[45] Reissued Date of Patent: Dec. 7, 1999

[54] ALTERNATING ELECTRIC FIELD DIMINISHING STRUCTURE FOR CATHODE RAY TUBE DEVICE

[75] Inventor: Tetsuya Yamaguchi, Nagaokakyo, Japan

[73] Assignee: Mitsubishi Denki Kabushiki Kaisha, Tokyo, Japan

[21] Appl. No.: 08/887,928

[22] Filed: Jul. 3, 1997

Related U.S. Patent Documents

Reissue of:

[64] Patent No.: 5,430,352
Issued: Jul. 4, 1995
Appl. No.: 08/049,349
Filed: Apr. 21, 1993

[30] Foreign Application Priority Data

Apr. 23, 1992 [JP] Japan ..... 4-131769

[51] Int. Cl.[6] ..... H01J 29/70; H01J 31/00

[52] U.S. Cl. ..... 313/440; 313/479; 313/413; 335/210; 335/212; 335/214; 348/820

[58] Field of Search ..... 313/479, 440, 313/413; 335/210, 212, 214; 348/820

[56] References Cited

U.S. PATENT DOCUMENTS

| | | | |
|---|---|---|---|
| 3,831,123 | 8/1974 | Aldrich et al. . | |
| 4,151,561 | 4/1979 | Kratz et al. . | |
| 4,560,900 | 12/1985 | Ikegaki et al. | 313/479 |
| 4,988,915 | 1/1991 | Zegers | 313/479 |
| 5,019,745 | 5/1991 | Deal et al. | 313/440 |
| 5,138,290 | 8/1992 | Togane et al. | 313/440 |
| 5,204,649 | 4/1993 | Togane et al. | 313/440 |
| 5,250,876 | 10/1993 | Van Maierlo et al. | 313/440 |
| 5,304,891 | 4/1994 | Otsuka | 335/214 |

FOREIGN PATENT DOCUMENTS

| | | | |
|---|---|---|---|
| 4107766A1 | 9/1991 | Germany . | |
| 4219027A1 | 1/1993 | Germany . | |
| 57-32552 | 2/1982 | Japan | 313/440 |
| 57-47544 | 10/1982 | Japan . | |
| 2301942 | 12/1990 | Japan | 313/440 |
| 4308634 | 10/1992 | Japan | 313/440 |
| 5036362 | 2/1993 | Japan | 313/440 |
| 2255441 | 11/1992 | United Kingdom . | |

*Primary Examiner*—Nimeshkumar D. Patel

[57] ABSTRACT

A cathode ray tube device capable of providing sufficient shielding effect against leaking alternating electric field while exhibiting high reliability during long use. Alternating electric field generated by a deflection yoke is sufficiently reduced by the shielding effect produced by a conductive film formed on a funnel portion. A gap formed between the conductive film and an insulating sheet provided between the conductive film and the deflection yoke, due to dimensional error, is filled with insulating silicone grease, so as to avoid secular degradation of insulation which otherwise may occur due to accumulation of dust and other matters.

3 Claims, 5 Drawing Sheets

ALTERNATING ELECTRIC FIELD DIMINISHING STRUCTURE FOR CATHODE RAY TUBE DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a cathode ray tube device and, more particularly, to a cathode ray tube device in which alternating electric field radiated from the deflection yoke is diminished.

2. Description of the Related Art

Referring to FIG. 4, a known CRT device has a funnel portion 1 which includes a neck portion 1a, a cone portion 1b and a funnel main body portion 1c which has a high voltage anode button 1d and is frit sealed onto a face panel portion 2. Numeral 1e denotes a junction between the neck portion 1a and the cone portion 1b, generally referred to as "neck seal line". The neck seal line has a glass wall thickness slightly smaller than those of other portions and, hence, is inferior to other portions in regard to strength. The above mentioned portions in cooperation form a glass bulb 20.

An electron gun 3 is sealed to the neck portion 1a. An explosion proof band 4 is wound on the side faces on the face panel portion 2 so as to provide explosion proof nature. A silicone resin film 5 is formed around the high voltage anode button 1d on the funnel main body portion 1c for the purpose of electrical insulation. A conductive film 6 for imparting electrostatic capacitance to the cathode ray tube is formed on the outer surface of the funnel main body portion 1c. Usually, the conductive film 6 is formed by applying, for example, a paste of graphite and may be discontinuous when viewed microscopically. Numeral 28 designates a straight line which is parallel to the neck 1a and which constitutes the axis of the cathode ray tube.

The cathode ray tube device thus formed has, as shown in FIG. 5, a deflection yoke 7 which is secured to a portion of the glass bulb between the cone portion 1b and the neck portion 1a and which serves to deflect the electron beam. Referring to FIG. 6, the deflection yoke 7 is composed of a horizontal deflection coil 7a, a vertical deflection coil 7b and a deflection yoke main body portion 7c. The fixing of the deflection yoke 7 to the funnel portion 1 is achieved by means of a fixing band 10 which is provided on a portion of the deflection yoke 7 adjacent to the neck portion 1a. A gap generally referred to as "self convergence system" is provided between the deflection yoke 7 and the funnel portion 1 for the purpose of adjustment of the convergence characteristics. The size of this gap is adjustable by oscillation of the deflection yoke 7 around the fixing band 10. This operation will be referred to as "oscillation convergence adjustment", hereinafter.

In operation, an electron beam emitted from the electron gun 3 sealed to the neck portion 1a is deflected both in the horizontal and vertical directions by means of the horizontal deflection coil 7a and the vertical deflection coil 7b of the deflection yoke 7, so as to scan a fluorescent film formed on the inner side of the face panel portion 2, thereby forming a desired image. The amplitude of the deflection of the electron beam is in inverse proportion to the square root of the voltage applied to the anode button 1d mentioned above.

In recent years, undesirable effect of electromagnetic waves on human bodies has been noticed as a problem to be overcome. This problem has been recognized also in display monitors. Namely, there is a fear that the human bodies are adversely affected by alternating electric field generated mainly by deflection yoke, i.e., electric field radiated from the deflection yoke. Based upon such recognition, National Conference of Measurement and Test of Sweden (MPR), as well as Central Labor Conference of Sweden (TCO), has proposed standards concerning electromagnetic waves emitted from display monitors, as shown in Table 1 below.

TABLE 1

| ELF band | VLF band | Measuring condition |
|---|---|---|
| 5 Hz to 2 KHz | 2.5 V/m or | 50 cm apart from CRT |
| MPR | less | face, 20° C., 21% humidity |
| TCO 10 V/m or | 1.0 V/m or | 30 cm apart from CRT |
| less | less | face, 20° C., 21% humidity |

Thus, the known cathode ray tube devices have no measure for shielding alternating electric field which is radiated from the deflection yoke. The present inventors have measured the alternating electric field at VLF band on a cathode ray tube of 16 inch size and having an anticharge coating of 2.6×109 W on face plate to obtain the results as shown in Table 2 below.

TABLE 2

| Type of CRT | Anticharge treated CRT | |
|---|---|---|
| Measuring method | MPR11 | TCO |
| AC filed Hor. Freq. 31 KHz | 2.3 V/m | 5.0 V/m |
| VLF band Hor. Freq. 45 KHz | 3.4 V/m | 8.3 V/m |
| (V/m) Hor. Freq. 64 KHz | 4.8 V/m | 12.0 V/m |

From Table 2, it is understood that the intensity of alternating electric field at VLF band has a dependency on horizontal frequency. More specifically, when the horizontal frequency is elevated to cope with a demand for higher resolution, the alternating electric field at VLF band is correspondingly increased. Consequently, alternating electric field of an intensity exceeding the standard levels shown in Table 1 penetrates the funnel portion and the face panel of the CRT so as to adversely affect the user's body.

As a countermeasure for obviating this problem, an arrangement is proposed in Japanese patent Laid Open No. 3116902 in which a grounded conductive film is formed on a predetermined area of the surface of the funnel portion and the deflection yoke is mounted via an insulating member which covers the conductive film.

This arrangement, however, poses a problem in that a gap is often formed between the conductive film on the cone portion and the insulating member due to dimensional error of the cone portion and the insulating member incurred during manufacturing of the cathode ray tube device, tending to degrade insulation due to accumulation of dust and other foreign matters in the gap during long use of the cathode ray tube device.

SUMMARY OF THE INVENTION

Accordingly, an object of the present invention is to provide a cathode ray tube device in which generation of alternating electric field is diminished and degradation of insulation due to accumulation of dust and so forth is prevented, thereby overcoming the above describe problems of the prior art.

To this end, according to the present invention, there is provided a cathode ray tube device, comprising:

a funnel portion including a neck portion for sealing an electron gun therein, a cone portion, and a funnel main body portion having a grounded electrically conductive film for imparting electrostatic capacitance to [a portion of an outer surface of the neck portion] *the cathode ray tube device*;

a face panel having a fluorescent film on an inner surface thereof and connected to a front end of the funnel main body portion;

a deflection yoke mounted on the cone portion of the funnel portion; and alternating electric field reduction means for reducing an alternating electric field generated from the deflection yoke and emitted from a front surface of the face panel through the funnel portion;

the alternating electric field reduction means comprising a grounded electric field shielding conductive film disposed on a predetermined surface area of the funnel portion, an electrically insulating member disposed on the grounded electric field shielding conductive film, and a semi-solid electrically insulating material filled within a gap between the electrically insulating member and the grounded electric field shielding conductive film.

According to the present invention, any gap between the electric field shield conductive film which is provided on the predetermined area of the surface of the funnel portion for the purpose of reducing alternating electric field, and the insulating member on the conductive film is filled with a semi-solid filler material such as silicone grease, so that accumulation of dust and other matters in the gap is prevented even when the cathode ray tube device is used for a long time.

These and other objects, features and advantages of the present invention will become clear from the following description of the preferred embodiment when the same is read in conjunction with the accompanying drawings.

DESCRIPTION OF THE PREFERRED EMBODIMENTS

Figure 1:
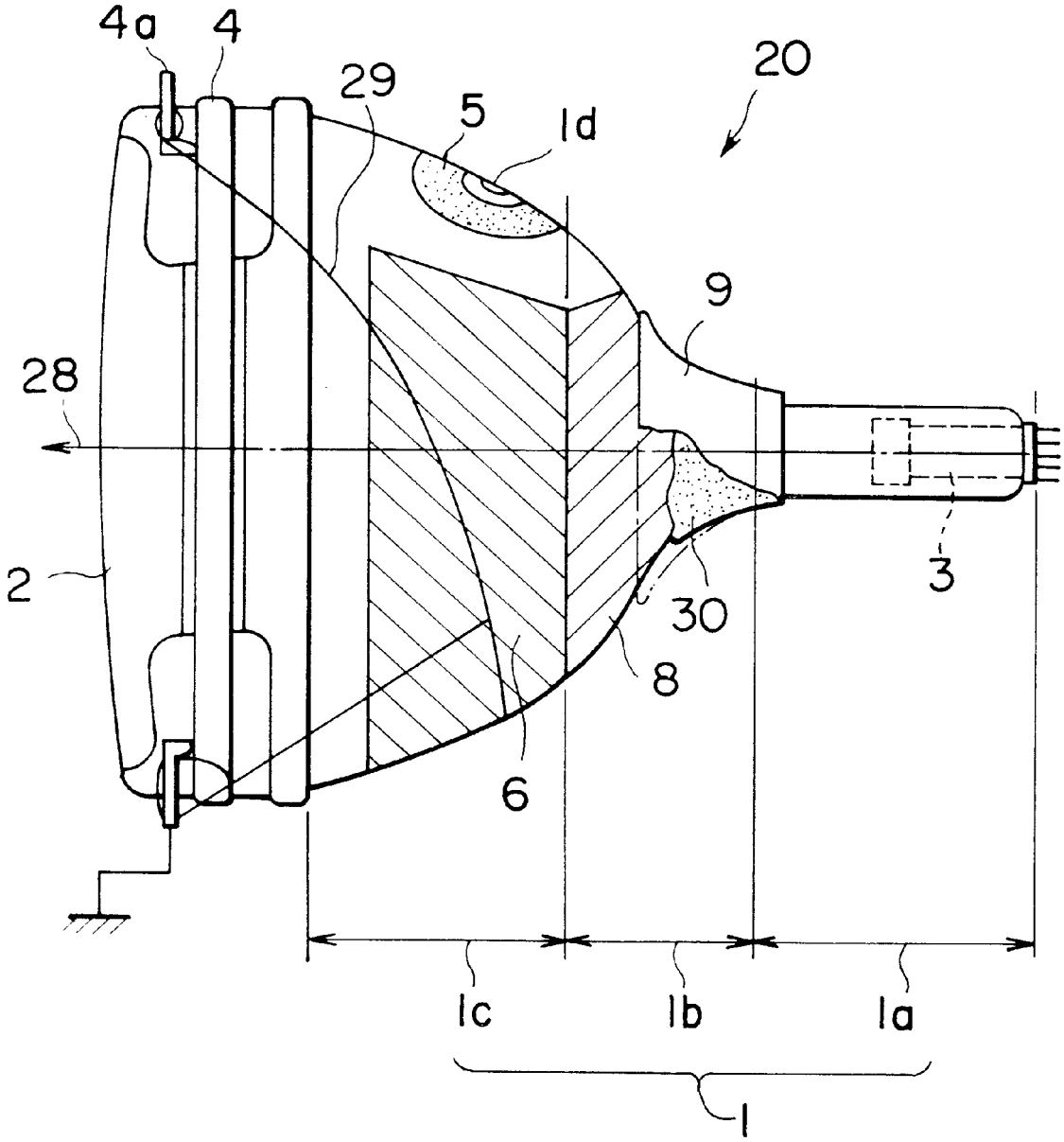
FIG. 1 is an illustration of the construction of alternating electric field reduction means employed in an embodiment of the cathode ray tube device in accordance with the present invention.
Figure 2:
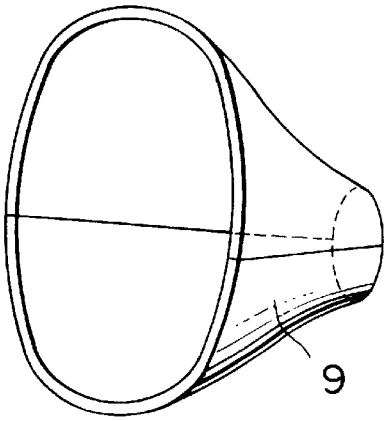
FIG. 2 is an illustration of an insulating sheet which serves as part of the alternating electric field reduction means.
Figure 3:
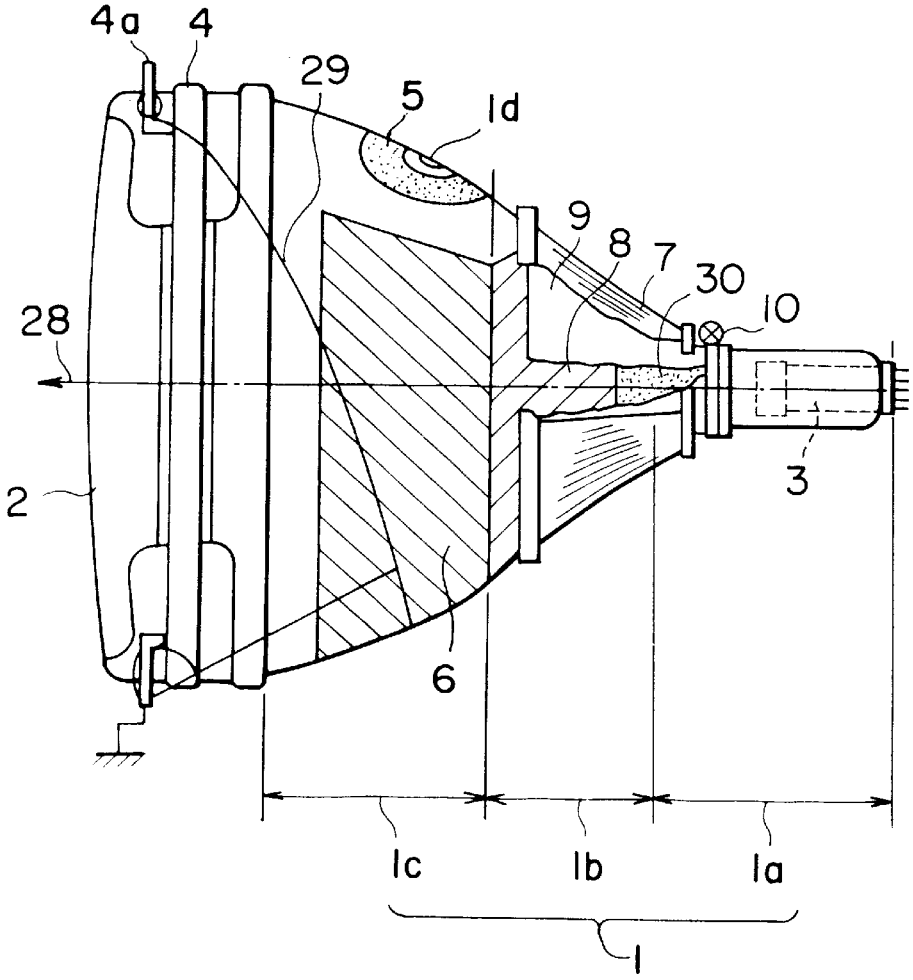
FIG. 3 is an illustration of an assembly including a glass bulb having the alternating electric field reduction means and a deflection yoke mounted on the glass bulb.
Figure 4:
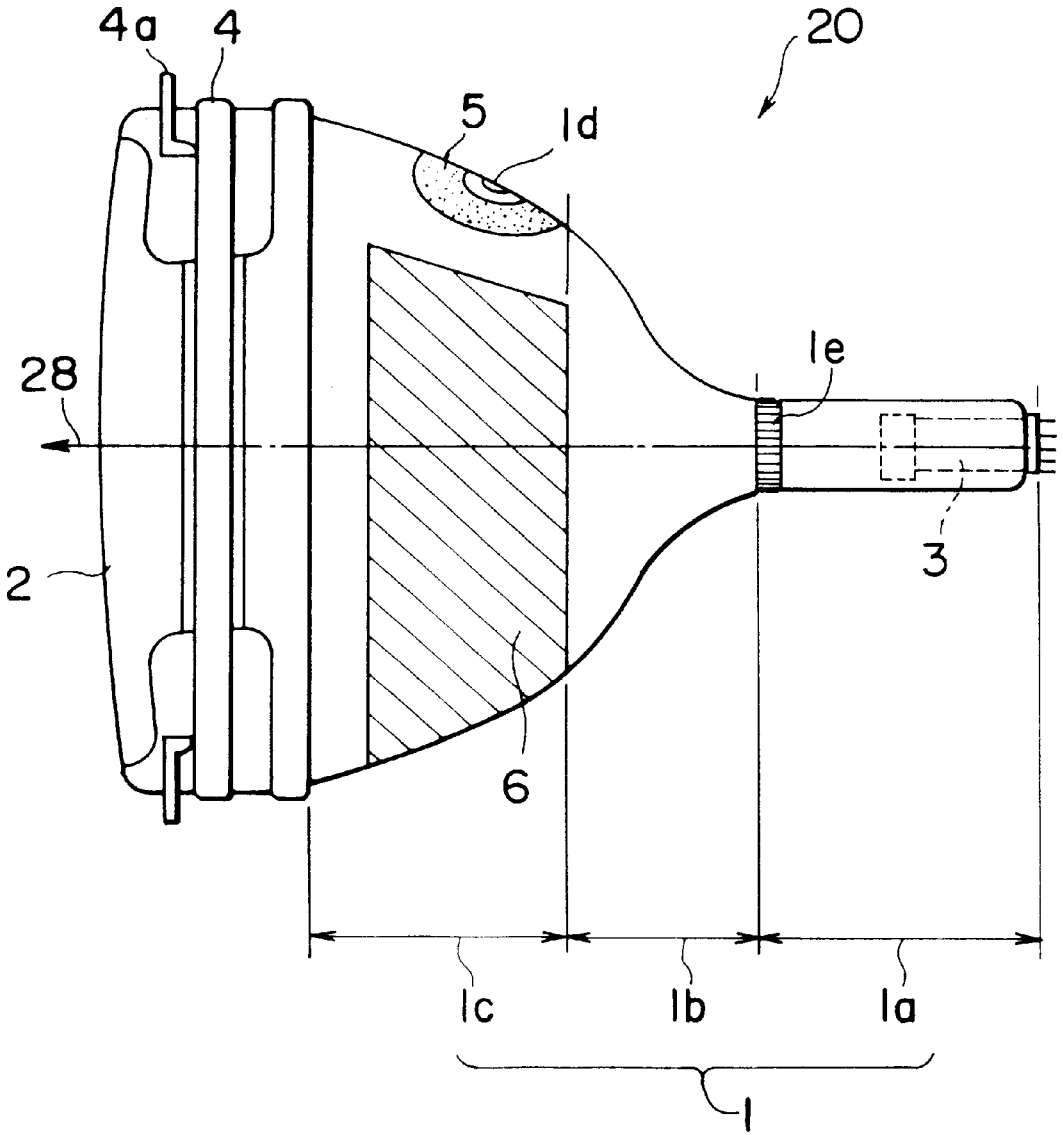
FIG. 4 (Conventional Art)
FIG. 4 is an illustration of the construction of the glass bulb of a known cathode ray tube device.
Figure 5:
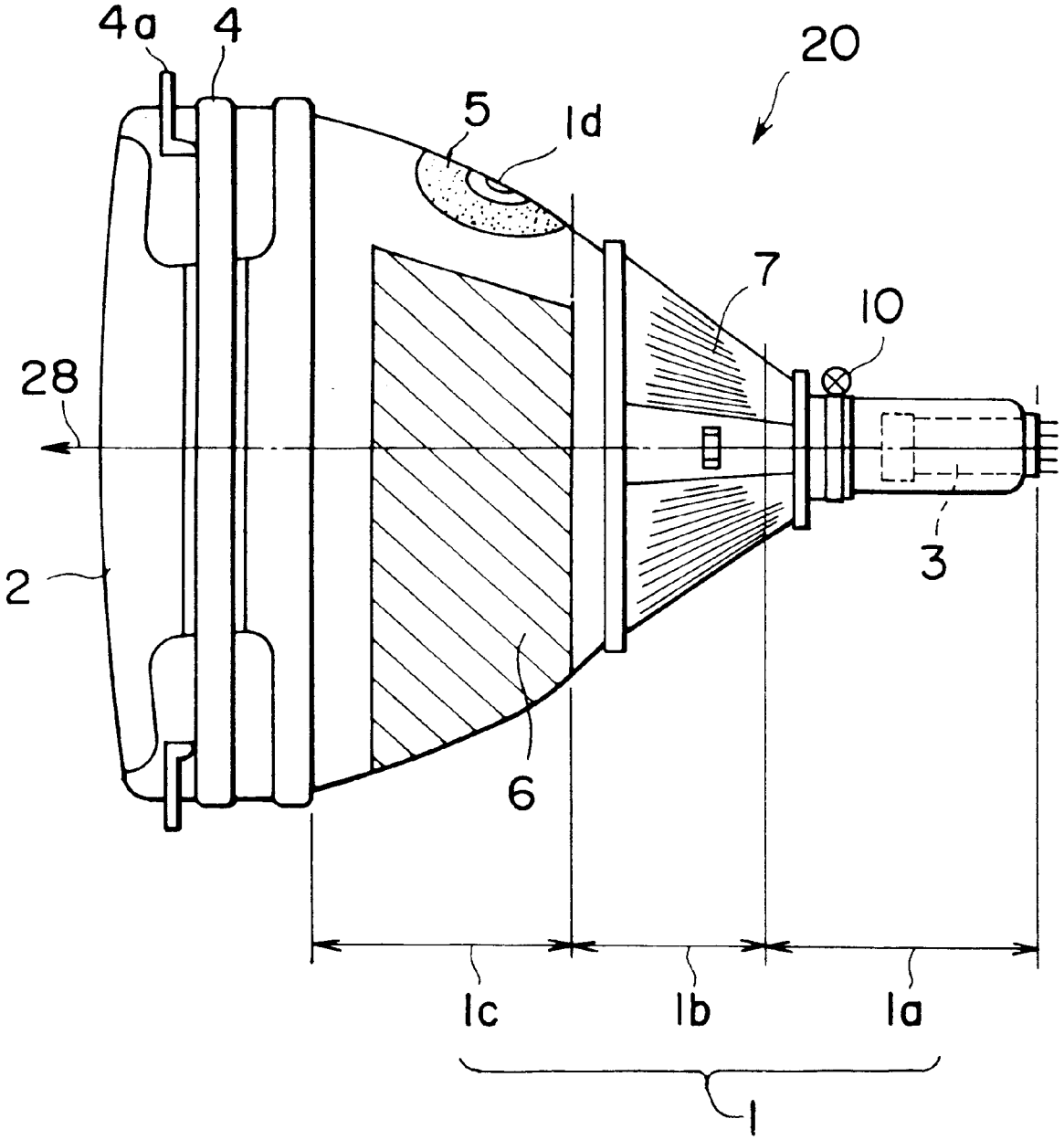
FIG. 5 (Conventional Art)
FIG. 5 is an illustration of the construction of the known cathode ray tube device having the deflection yoke mounted on the glass bulb.
Figure 6:
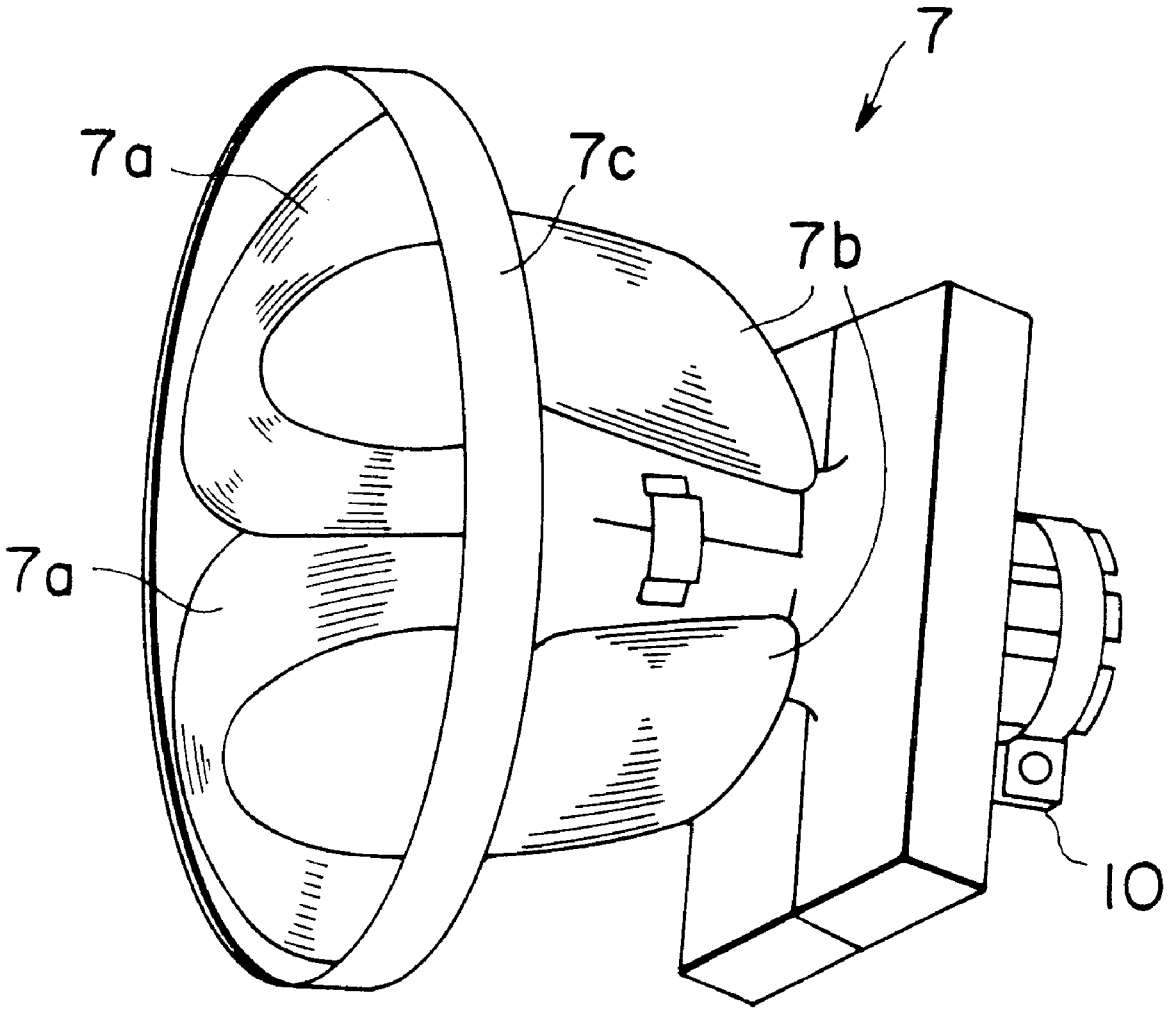
FIG. 6 (Conventional Art)
FIG. 6 is an illustration of the construction of the deflection yoke incorporated in the cathode ray tube device.

An embodiment of the present invention will be described with reference to the accompanying drawings. FIG. 1 shows an embodiment of the cathode ray tube device of the present invention. In this Figure, the same reference numerals are used to denote the same parts or members as those appearing in FIGS. 4 to 6 showing the known cathode ray tube device. An electric shield conductive film 8 is formed on a portion of the glass bulb from the cone portion 1b to the neck portion 1a, in electrical connection to the conductive film 6 so as to form an electric field shield surface. The conductive film 8 is formed by, for example, applying graphite, in such a manner as to wholly cover the opening of the deflection yoke. The conductive film 6 is grounded via a ground line 29 through an explosion proof band 4. Numeral 9 denotes an insulating sheet which provides electrical insulation between the conductive film 8 and the coil portion of the deflection yoke 7. This sheet has a funnel like form and is secured to the funnel portion 1b and the neck portion 1a. A gap between the conductive film 8 and the insulating sheet 9 is filled with semi-solid insulating filler, such as uncurable silicone grease 30 formed of a silicone compound. As shown in FIG. 3, the deflection yoke 7 is mounted on the glass bulb 20 via the insulating sheet 9.

A description will now be given of the operation of this embodiment. In the cathode ray tube device having the described construction, the conductive film 6 and the conductive film 8 are set to an equal potential of 0 V, so that a surface having an electric field shielding effect is formed on the front region of the deflection yoke 7 and on the surface of the face panel portion 2. Consequently, the alternating electric field generated by the deflection yoke 7 is attenuated by the electric field shield surface formed on the funnel portion 1.

The insulating sheet 9 disposed between the horizontal coil 7a of the deflection yoke 7 and the conductive film 8 electrically insulates the horizontal coil 7a and the conductive film 8 from each other, thus preventing discharging and other undesirable phenomenon.

In addition, any gap between the conductive film 8 and the insulating sheet 9, which may be formed due to possible dimensional error of the cone portion 1b and the insulation sheet 9 in the course of manufacture, is filled with insulating silicone grease 30, so as to eliminate any risk of degradation of insulation between the conductive film 8 and the insulating sheet 9 which otherwise may be caused by deposition of dust and other matters in the gap.

The insulating silicone grease used as the filler material filling the gap in the neck portion is uncurable so that it can be deformed well following up deformation which is caused in convergence adjustment during fixing the deflection yoke 7 by means of the band 10, thus preventing any reduction in the efficiency of production.

As will be understood from the foregoing description, according to the present invention, it is possible to reduce the alternating electric field by virtue of the use of the silicone grease filling the gap between the electric field shielding conductive film 8, formed on a predetermined area of the funnel portion, and the insulating sheet 9 which provides electrical insulation between the conductive film 8 and the deflection yoke 7. In addition, any dimensional error of the cone portion 1b and the insulating sheet 9 incurred during the manufacture can be absorbed by silicone grease which exists therebetween, while degradation due to accumulation of dust and other matters is avoided, thus offering high reliability of the cathode ray tube device over a long period of use. The insulating silicone grease 30, which has a fluid nature, does not hamper the oscillation convergence adjustment of the deflection yoke 7.

As has been described, the present invention provides a cathode ray tube device having an electric field shielding conductive film provided on a predetermined area of the funnel portion for the purpose of reducing alternating electric field, an insulating sheet on the surface of the conductive film, and a semi-solid insulating filler material filling any gap between the conductive film and the insulating sheet. Consequently, alternating electric field leaking through the face plate of the cathode ray tube and directed to the human body is sufficiently shielded by the electric field shield, and deposition of dust and other matters in the gap between the conductive film and the insulating sheet is avoided, thus maintaining electrical insulation between the conductive film and the deflection yoke for a long time, without impeding oscillation convergence adjustment of the self convergence system. According to the invention, it is thus possible to obtain a cathode ray tube device which has a high degree of reliability and which is suitable for mass production.

What is claimed is:

1. A cathode ray tube device, comprising:

a funnel portion including a neck [protion] *portion* for sealing an electron gun therein, a cone portion, and a funnel main body portion having a grounded electrically conductive film for imparting electrostatic capacitance to [a portion of an outer surface of said neck portion] *said cathode ray tube device*;

a face panel having a fluorescent film on an inner surface thereof and connected to a front end of said funnel main body portion;

a deflection yoke mounted on said cone portion of said funnel portion; and alternating electric field reduction means for reducing an alternating electric field generated from said deflection yoke and leaking from a front surface of said face panel through said funnel portion;

said alternating electric field reduction means comprising a grounded electric field shielding conductive film disposed on a predetermined surface area of said funnel portion, an electrically insulating member disposed on said grounded electric field shielding conductive film, and a silicone grease having an electrically insulating characteristic filled within a gap between said electrically insulating member and said grounded electric field shielding conductive film.

2. A cathode ray tube device as claimed in claim 1, wherein said grounded electric field shielding conductive film comprises a graphite coating.

3. A cathode ray tube device as claimed in claim 1, wherein said grounded electrical field shielding conductive film is grounded through said grounded electrically conductive film.

* * * * *